United States Patent
Huber et al.

(10) Patent No.: US 6,318,397 B1
(45) Date of Patent: Nov. 20, 2001

(54) SIDE PORT FLOOR DRAIN

(76) Inventors: Donald G. Huber, P.O. Box 64160, Tacoma, WA (US) 98464; Allen I. Stakset, 111107 - 18th E Ave., Tacoma, WA (US) 98445

( * ) Notice: Subject to any disclaimer, the term of this patent is extended or adjusted under 35 U.S.C. 154(b) by 0 days.

(21) Appl. No.: 09/631,844

(22) Filed: Aug. 3, 2000

Related U.S. Application Data

(60) Provisional application No. 60/147,212, filed on Aug. 4, 1999.

(51) Int. Cl.[7] ............................................. F16K 15/14
(52) U.S. Cl. ..................... 137/15.19; 137/362; 137/855; 137/856
(58) Field of Search ................................. 137/362, 855, 137/856, 512.1

(56) References Cited

U.S. PATENT DOCUMENTS

| | | | |
|---|---|---|---|
| 2,049,340 | * 7/1936 | Van Der Horst et al. | 137/362 |
| 2,348,097 | 5/1944 | Smith | 277/55 |
| 2,371,449 | 3/1945 | Langdon | 137/69 |
| 2,516,578 | * 7/1950 | Kreiner | 137/855 |
| 2,675,823 | 4/1954 | Langdon | 137/218 |
| 3,107,687 | 10/1963 | Howe | 137/362 |
| 3,116,751 | * 1/1964 | Hamilton | 137/362 |
| 3,610,270 | * 10/1971 | Attle | 137/362 |
| 3,762,437 | * 10/1973 | King, Sr. | 137/512 |
| 3,969,847 | * 7/1976 | Campagna et al. | 137/512.1 |
| 4,098,287 | 7/1978 | Baumbach | 137/362 |
| 4,232,706 | 11/1980 | Ericson | 137/375 |
| 4,535,807 | 8/1985 | Ericson | 137/533.31 |
| 4,744,109 | 5/1988 | Yuill | 4/287 |
| 4,836,151 | * 6/1989 | Litjens et al. | 123/65 V |
| 4,870,992 | 10/1989 | Irwin et al. | 137/846 |
| 5,005,603 | 4/1991 | Amundson et al. | 137/192 |
| 5,070,896 | * 12/1991 | Warren | 137/1 |
| 5,419,359 | 5/1995 | Kor | 137/247.15 |
| 5,662,138 | 9/1997 | Wang | 137/433 |
| 5,797,426 | 8/1998 | Powell | 137/533.11 |

FOREIGN PATENT DOCUMENTS

495000 * 8/1954 (IT).

* cited by examiner

*Primary Examiner*—A. Michael Chambers

(57) ABSTRACT

An improved floor drain for buildings, basements, exterior paved areas, and the like. The invention provides floor drain assemblies and floor drains providing improved drainage performance, particularly where drainage is an irregular occurrence, and having unprecedented simplicity and reliability. Floor drains according to the invention comprise side port drain valves adapted for disposition within floor drains, the drain valves generally comprising non-horizontal drain ports, one or more sealing surfaces disposed between the ports and a drain conduit, a stop adapted for sealing engagement of the sealing surface, and means to urge the stop into sealing engagement of the sealing surface. Floating, spring-loaded, or flexible elastic valves stops, among others, may be used; any of them may be tailored for opening under a selected hydrostatic pressure. Use of side port drains according to the invention permits drainage through the drain conduit while preventing back flow from the drain of undesirable or unwanted gasses. Drain assemblies according to the invention are preferably installable in existing drain structures, and easily removable for maintenance or replacement.

18 Claims, 5 Drawing Sheets

SIDE PORT FLOOR DRAIN

This application claims the benefit of U.S. Provisional Application Ser. No. 60/147,212, entitled Side Port Floor Drain, and filed Aug. 4, 1999.

TECHNICAL FIELD

The invention relates to drains for building floors, basements, exterior paved areas, and the like. The invention provides floor drain assemblies and valves providing improved drainage performance, particularly where drainage is an irregular occurrence.

BACKGROUND OF THE INVENTION

U-shaped or "gooseneck" traps have long been used in the plumbing industry to prevent backflow of harmful or annoying sewer or pipe gasses into buildings while permitting drainage of unwanted water from floors and other horizontal surfaces. Such traps operate by leaving a small quantity of fluid within the lower portion of a U-shaped trap section to act as a gas barrier. In many applications, however, particularly where access is difficult or where drainage is rare, it is disadvantageous to use such drains. Fluid may evaporate from the trap, permitting free flow of obnoxious gases through the drain; or in some instances the fluids may harden so as to actually block or restrict flow through the drain. Such conventional drains are also relatively difficult and expensive to install. In addition to floor drain applications, these problems are also common to other areas of fluid control, wherever fluid drainage is an occasional problem.

One solution to these problems has been the use of trap primers, which operate to ensure that a minimum level of fluid is left in the drain to act as a trap for gasses which accumulate Vertically aligned check valves present promising possibilities, as for example as described in my patent application Ser. No. 60/141,913, entitled Check Valve Floor Drain and filed Jun. 30, 1999. However, however, vertically aligned check valves and the like have in some circumstances betrayed a tendency to become fouled by dirt, rocks, and other objects which become caught between the valve stop itself and the valve seat, thus permitting backflow of gasses from within the drain and in some cases retarding or completely blocking drainage of fluid through the valve.

Thus there is need for a simple, economical, and dependable floor drain which will provide efficient operation even when left dry or not called upon to function over long periods of time, and which shows a reduced tendency to become fouled by foreign matter.

DISCLOSURE OF THE INVENTION

Accordingly, it is an object of the invention to provide simple, economical, and dependable floor drain apparatus which will provide efficient operation even when left dry or not called upon to function over long periods of time and which shows a reduced tendency to become fouled by foreign matter. This and such other objects of the invention as will become evident from the disclosure below are met by the invention disclosed herein.

The invention provides improved floor drains of unprecedented simplicity and reliability. In one aspect, the invention provides a side port floor drain, the floor drain comprising a non-horizontal sealing surface around a drain port, a stop or port cover adapted for sealing engagement of said sealing surface, and means to urge the stop into sealing engagement with the sealing surface. The means for urging the stop into sealing engagement with the sealing surface is adapted to permit disengagement of the stop from the sealing surface as a liquid enters the drain, so that drainage of the fluid through said drain is permitted, while backflow of gasses from within the drain after the fluid has drained is prevented. Preferred embodiments of this aspect of the invention comprise a plurality of sealing surfaces and drain ports, and generally of stops or port covers as well, although as will appear it is both possible and in some circumstances desirable to provide stops which cover more than one port simultaneously.

In many embodiments of this aspect of the invention the sealing surface of the drain is substantially vertically aligned, as shown in FIG. 1. However, it has been found that by giving some substantial slope, generally between about 5 degrees and about 70 degrees, and most preferably between about 10 degrees and about 40 degrees, to the drain surface an improved seal against drain gas backflow may be provided. This is due to the possibility of using gravity to assist the means for urging the stop into sealing contact with the drain surface, as may be seen in the Figures.

In another aspect the invention provides a side port floor drain for use with a drain conduit, the floor drain in this aspect comprising a non-horizontal drain port, a sealing surface between the drain port and the drain conduit, a stop adapted for sealing engagement of the sealing surface, and means to urge the stop into sealing engagement with the sealing surface. The means for urging the stop into sealing engagement with the sealing surface is adapted to permit disengagement of the stop from the sealing surface as liquid enters the drain, whereby drainage of the liquid through said drain is permitted, while backflow of gasses from within the drain is prevented after the liquid has drained. Preferred embodiments of this aspect of the invention comprise a drain ports. Preferred stops comprise elastic valves, as previously described, or flotation devices such as ball valves or specially adapted floats. Drain ports may be substantially vertical or sloped, depending upon the application to which they are to be put.

Preferred embodiments of the invention comprise stops incorporating "flapper" diaphragms made of elastic material, such as natural or synthetic rubbers, or other polymers. The diaphragm(s) in such embodiments have sufficient flexibility to flex under pressure or other action of liquid entering or exiting the drain in order to allow the liquid to drain, and to return to a substantially unflexed condition in which sealing engagement of the drain sealing surface by the diaphragm is restored following drainage of said liquid. In such embodiments, as may be seen, the elasticity of the diaphragm acts as the means for urging the diaphragm into sealing contact with the drain sealing surface. A particular advantage of such embodiments of the invention is that the elastic diaphragm may be relatively easily, through well known fluid static and dynamic principles, and through well known principles of structural mechanics, be adapted to flex under the action of a preselected head pressure when fluid is present within the drain. That is, the geometry, and therefore the stiffness, of a diaphragm made of any given elastic material may be selected to ensure that the valve will open when a desired hydrostatic head or amount of water is present in the drain. As will be readily understood by those of ordinary skill in the art, once the suggestion has been made, this purpose may be accomplished either by selecting an appropriate uniform thickness for the diaphragm or by tailoring the thickness to provide a non-uniform thickness having any of a wide variety of desired flexure or bending characteristics. Another way of controlling flexure in the diaphragm, as will be well understood by those of ordinary skill in the art, is to provide the elastic diaphragm with a back plate which serves to stiffen or otherwise support at least a portion of the diaphragm. In such cases portions of the diaphragm supported by the back plate will have a generally increased stiffness, as compared to non-backed portions of the diaphragm.

In other preferred embodiments of the invention the stop may be spring-biased, such that the means for urging the stop into contact with the drain sealing surfaces comprises a spring. As will be readily apparent to those having ordinary skill in the art, in such embodiments it is a relatively straightforward matter, once the idea has been suggested, to select or adapt a spring having an appropriate thickness for permitting disengagement of the stop from the sealing surface when a selected head pressure had been reached inside the drain.

By suitable arrangement of the drain port and stop with respect to the floor or other surface to be drained, it is possible to practice the invention such that the drain ports and stops are located at either the inlet portion of the drain or the outlet. That is to say, the stop may be located either at an inlet end of the drain port, on an interior surface of the floor drain housing, or at an outlet end of the drain port, on an exterior surface of the housing. Distinct advantages may be gained through the use of either arrangement, and in some circumstances by placing drain ports and stops at both locations.

In embodiments of the invention comprising more than one drain port and/or more than one drain stop, it is optional and in many cases advantageous to attach multiple stops to a sleeve adapted for sealing engagement of said drain housing. Because the stops are all included in a single piece, the quality of the seal between the sleeve and drain housing increased, and maintenance or replacement of the covers can be greatly simplified.

It is generally advantageous to provide floor drains according to this aspect of the invention with a housing to support the stop and the means for urging the stop into sealing contact with the drain sealing surface, the housing being adapted for removable or interchangeable disposition of the floor drain within an inlet to a drain conduit.

As will appear to those of ordinary skill in the art, floor drains according to the invention are suitable for use with drain conduits of arbitrary cross section. For example, floor drains according to the invention are as well suited to use in conjunction with standard circular drain conduits as to conduits of other, non-circular cross section, such as for example conduits of rectangular cross section.

An important advantage offered by drain valves according to the invention is that they may be provided either as integral parts of new drain assemblies or with separate housings to that they may be inserted in existing drain structures as retrofits. Thus new drains omitting P-or U-traps may be built, or existing drains having such traps may be provided with the advantages described herein. Likewise, stuck or damaged valves may be easily repaired or replaced. In preferred embodiments, the advantage of interchangeability or removability is easily provided by providing the drain valve and the biasing means with a housing. Such a housing may be used with or without separate gaskets, etc., for sealing the drain, and may easily be adapted such that the housing itself provides the sealing surface engaged by the stop for sealing of the drain.

Another advantage offered by drain valves according to the invention is that they are readily adapted to a wide variety of drains. For example, they are easily provided in substantially circular section, for use in a standard circular or cylindrical drain pipe, or as easily provided with a rectangular or other non-standard section.

Yet another distinct advantage offered by drain valves according to the invention is that they are easily installed or used in conjunction with other valves or with existing traps, so as to provide redundant valve structure and the advantages associated therewith. For example, two or more side port drains according to the invention may be used together, so that if one or more drain ports become jammed or otherwise dysfunctional others may continue to serve satisfactorily. Likewise, all of the other advantages and improvements described herein, such as the provision of the valve assembly with a housing to permit the valves to be retrofitted or removed for maintenance or replacement, are enjoyed by those embodiments incorporating additional valves.

In addition to the drain valves and drain assemblies described herein, as such, it is to be understood that all new and useful devices or components described herein are considered to constitute a part of the invention, claimable in their own right, whether such is stated with particularity herein or not.

BEST MODE OF CARRYING OUT THE INVENTION

Figure 1:
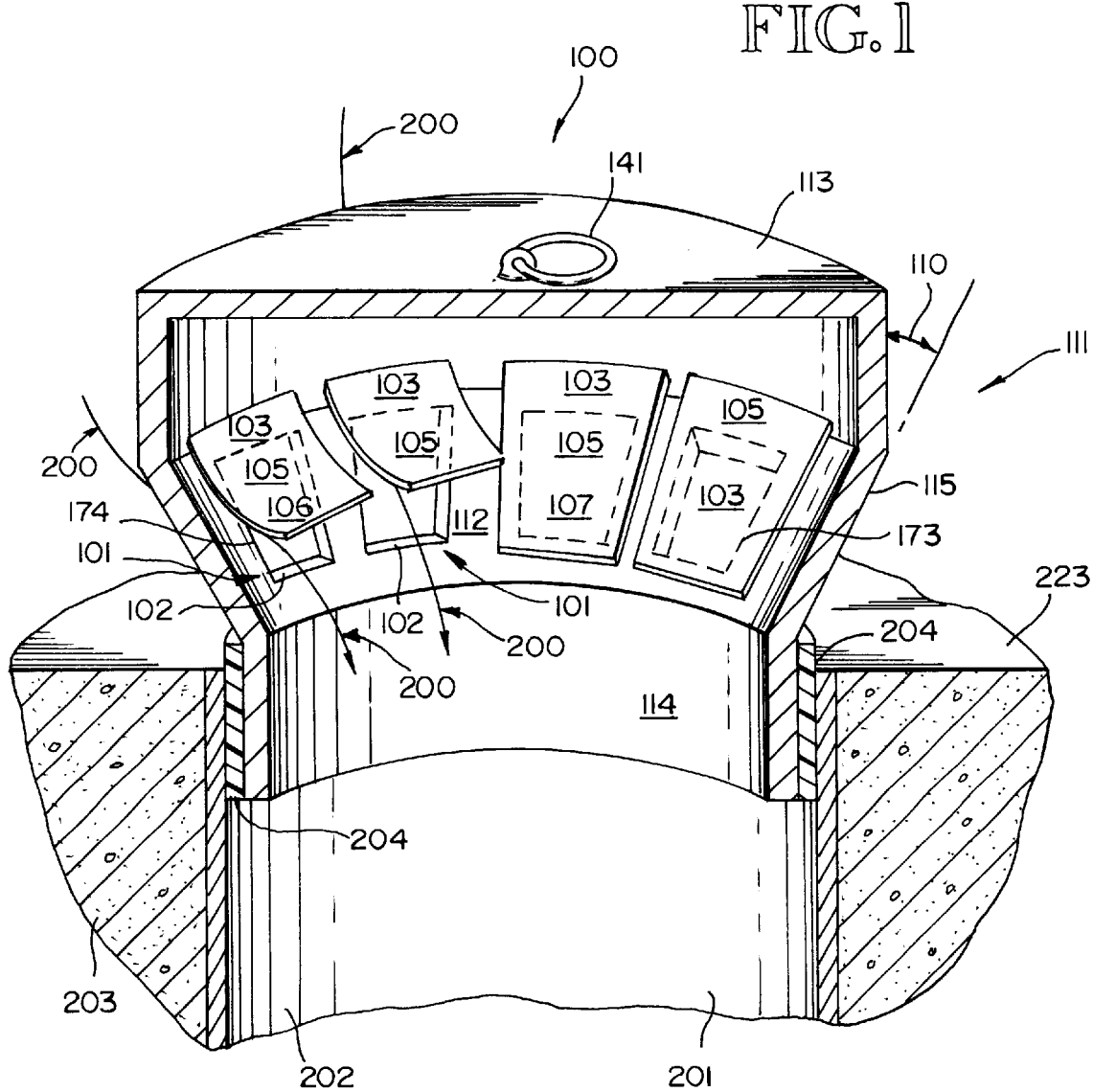
FIG. 1 is a schematic cutaway perspective view of a preferred embodiment of a side port floor drain according to the invention.

Turning now to the drawings, the invention will be described in a preferred embodiment by reference to the numerals of the drawing figures wherein like numbers indicate like parts.

FIG. 1 is a schematic cutaway perspective view of a preferred embodiment of a side port floor drain according to the invention. Side port floor drain 100 comprises non-horizontal sealing surface 101 which extends around a plurality of drain ports 102, a plurality of stops 103 adapted for sealing engagement of sealing surfaces 101, and means to urge the stops into sealing engagement with the sealing surface. The means is adapted to permit disengagement of stops 103 from sealing surface 101 as a liquid indicated by arrows 200 enters the drain. Thus drainage of liquid through drain 100 is permitted, while backflow of gasses 201 from within drain conduit 202 after drainage is complete is prevented.

As shown in FIG. 1, floor drain 100 is set in drain conduit 202 in floor 203, and is preferably removable. Sealing engagement between drain 100 and floor 203 or conduit 202 is optionally enhanced by the use of gaskets 204 and the like.

Figure 2:
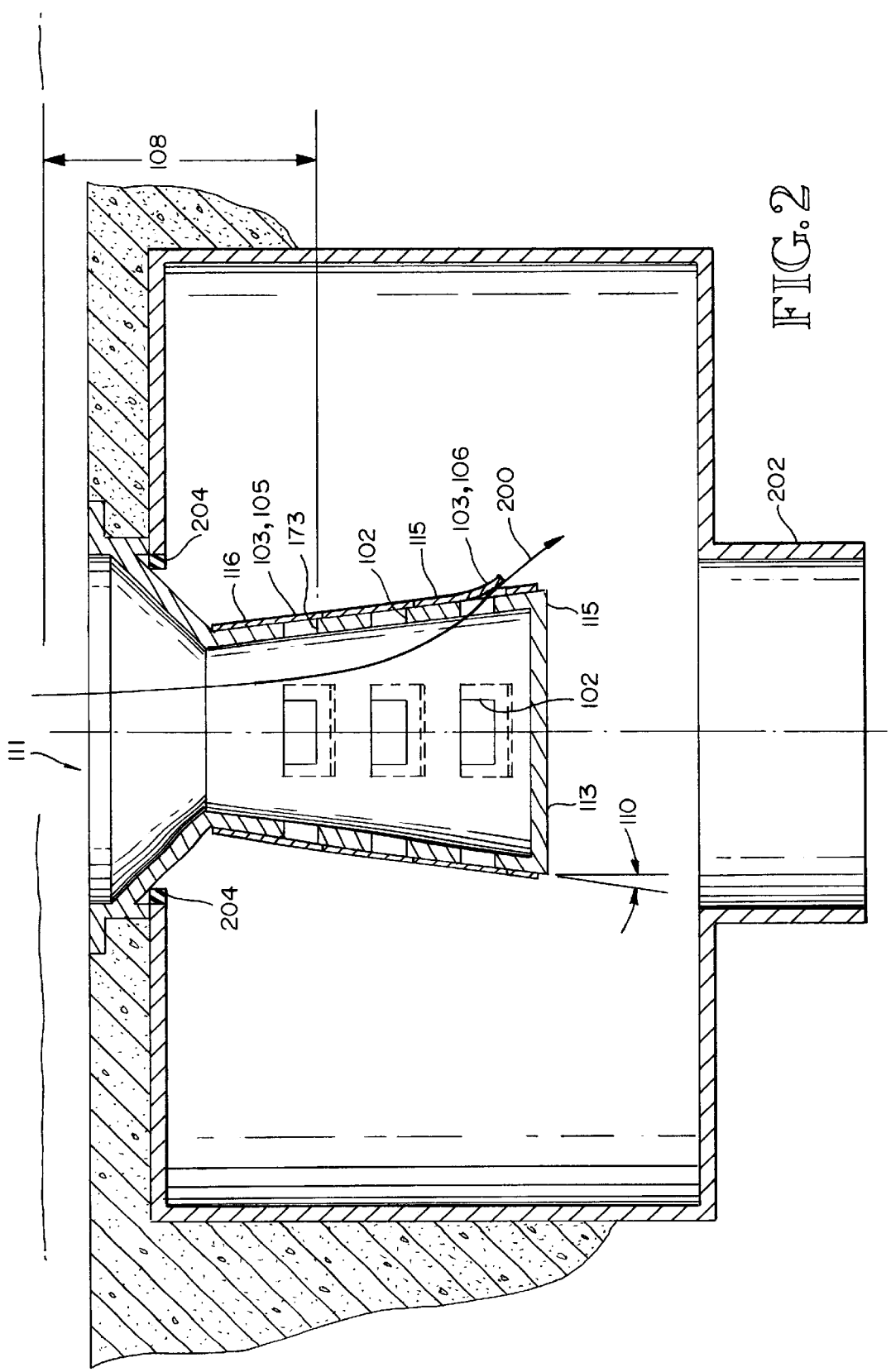
FIG. 2 is a schematic cross-sectional view of a preferred embodiment of a side port floor drain according to the invention.

In the embodiment shown in FIG. 1 stops 103 comprise elastic valves 105, which have sufficient flexibility to flex under action of 200 liquid and to allow drainage of the liquid, and sufficient resilience to return to a substantially unflexed condition 106 in which sealing engagement of the drain sealing surface by the valves is restored once the liquid has drained. Elastic valves 105 are preferably adapted to flex under the action of a preselected head pressure, such as that shown by head 108 in FIG. 2, within the drain. This may be accomplished in any number of ways, most of which will occur to those of ordinary skill in the art once they have been exposed to the material herein. For example, valve 105 may be made of a suitable uniform thickness such as thickness 109 shown in FIG. 2, or from a variable thickness tailored for any desired change in flow rate with respect to pressure. The structural properties of valves being relatively well known, and hydrostatic pressure being given by the well-known formula $$p=\rho gh,$$

where p=pressure, ρ=the specific gravity of the liquid to be drained through the valve, g=the local acceleration due to gravity or other body force acting on the liquid, and h=head, as shown by reference 108 in FIG. 2. Thus is it a straightforward matter for one having ordinary skill in the art, once armed with this disclosure, to select an appropriate head 108 and to design a valve 105 which will deflect suitably in the presence of that head.

Flexible valves 105 are set in the side of housing 113. Valves 105 are hinged or otherwise attached along one edge of each of ports 102 and adapted to open under influence of liquid present in the drain basin or above the floor to be drained. In preferred embodiments, valve covers 105 are fabricated from flexible elastic material such as sheet rubber (which may be either natural or synthetic, and composed of any suitable material) and are fastened or adhered along the top edge of their associated ports. Flexible valves 105, may be tailored by means of thickness (uniform or nonuniform) or material to open under any design hydrostatic pressure. It is advantageous, but not necessary, in making flexible side port valves to provide housing 113 with sloping sides, so that valves 105 are assisted by gravity or other body force in closing, so as to help prevent back flow of gasses from the interior of the drain conduit.

A particular advantage of side port floor drains according to the invention is the wide range of configurations available for use with the drain or drain housing. So long as the side walls of the drain or drain housing are not substantially horizontal, the purposes of the invention will be served. Thus any configuration between horizontal and perfectly vertical will serve. In many applications, and in particular those which incorporate elastic flapper valves of the type described herein, preferred embodiments of the invention comprise sealing surfaces 101 which are not perfectly vertical, so that the force of gravity can be used to assist the elastic valve or other stop in returning to the closed position, in which the stop engages the drain sealing surface. For example, in each of FIGS. 1–3 sealing surfaces 101 are sloped or offset from the vertical by an angle 110, the value of which may vary depending upon the application to which the drain is to be put and the size and nature of the stop or valve. Being armed with this disclosure, the designer of ordinary skill in the art will not be troubled to complete details of a suitably non-vertical sealing surface.

Figure 3:
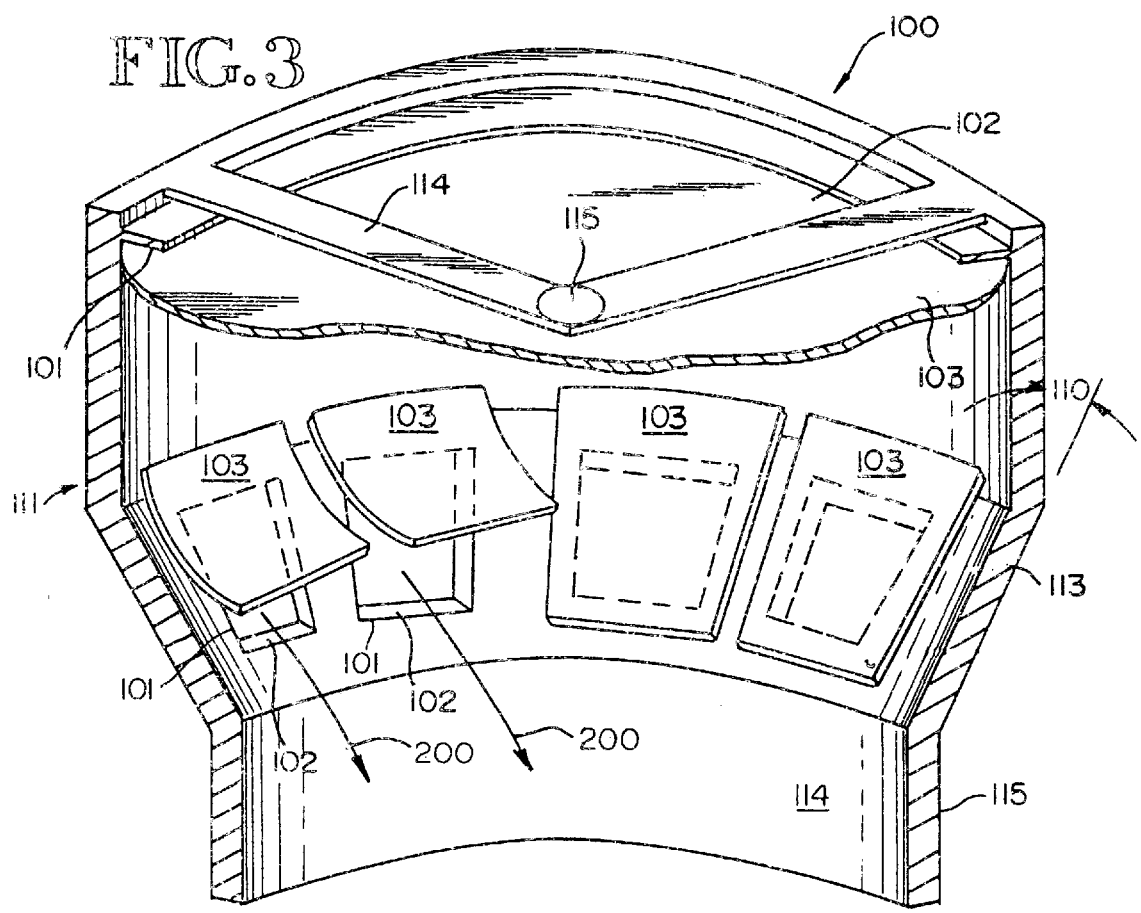
FIG. 3 is a schematic cutaway perspective view of an alternative preferred embodiment of a side port floor drain according to the invention.

In the embodiments shown in FIGS. 1 and 3, stops 103 are located at inlet end 111 of drain housing 113, on inner or interior surface 112 of the housing. Thus as water enters the drain, it pushes stops 103 inwardly to disengage the stops from the drain sealing surface, and drains through ports 102 at the inlet end of the drain. In the embodiment shown in FIG. 2, stops 103 are located at outlet end 114 of drain housing 113, on outer or exterior surface 115 of the housing. Thus as water enters the drain, it pushes stops 103 outwardly to disengage the stops from the drain sealing surface, and drains through ports 102 at the outlet end of the drain.

In embodiments of the invention comprising a plurality of drain ports 102 or drain stops 103, and especially flexible valves 105, it can be extremely efficient to mount several stops on a single sleeve, typically constructed of the same material as the stop or valve itself and placed around the sealing surface or surfaces 101. For example, in FIG. 2 sleeve 116 comprises a plurality of stops 103 in the form of flexible valves 105 placed around exterior surface 115 of drain housing 113 and so sized as to form a fluid-tight seal about the outside of the drain housing, thus being placed in a sealing engagement of the drain housing.

One advantage of providing side port floor drains according to the invention with an optional housing such as housing 113 in the Figures is that the housing may be provided with convenient means for installing and removing the drain in an existing drain conduit. For example, a ring placed in the top of the housing, such as ring 141 in FIG. 1, permits simple handling of the drain assemble. In addition to providing an attachment for the installation and removal means, housing 113 provides structural support for stops 103 and the biasing means, and optionally a drain sealing surface 101.

Figure 4:
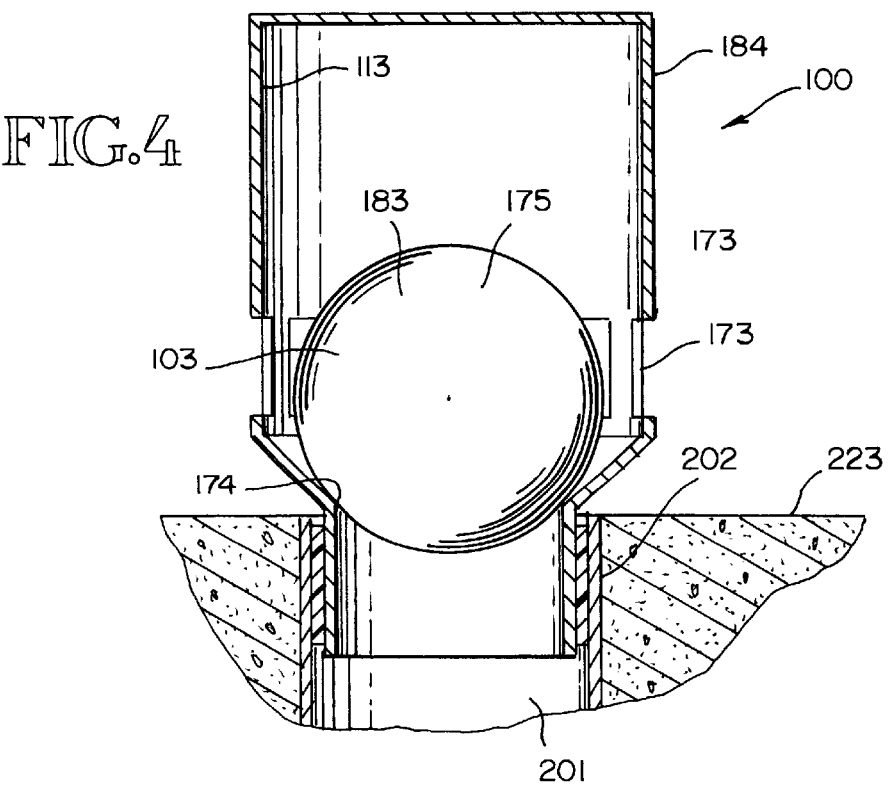
FIGS. 4 and 5 are schematic cutaway side views of an alternative preferred embodiment of a side port floor drain according to the invention.
Figure 5:
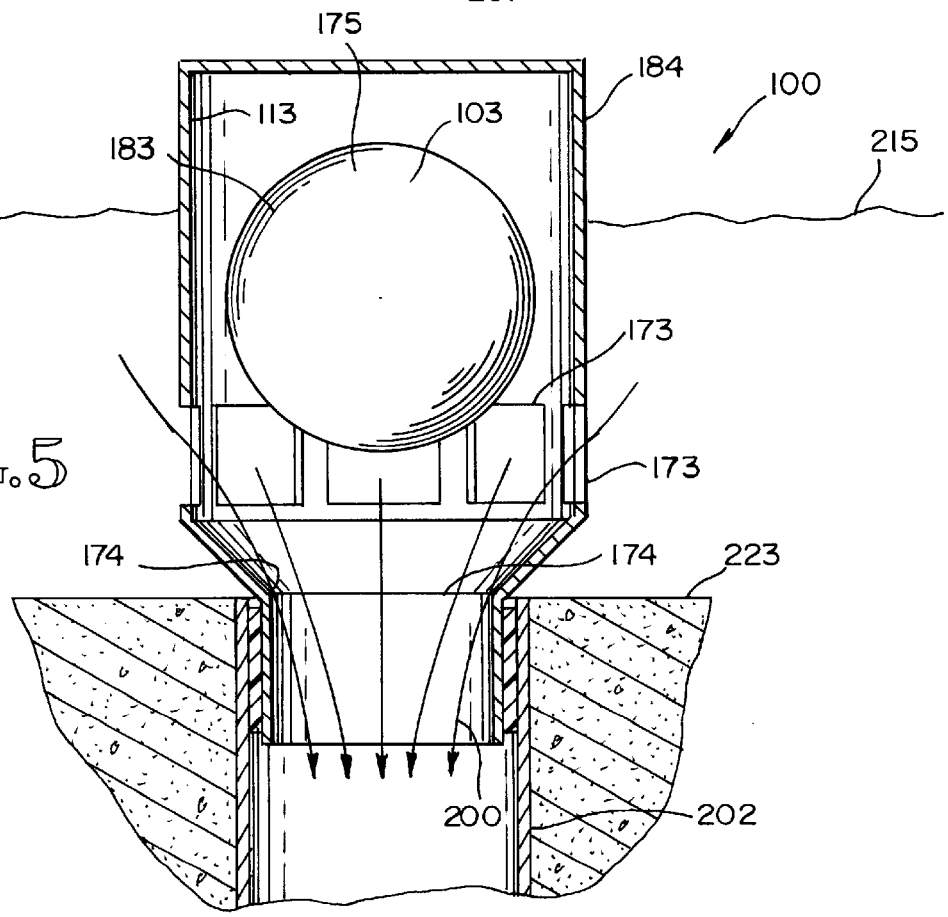

In FIGS. 4 and 5 the operation of an alternative preferred embodiment of the invention is shown. Side port floor drain 100 is in place within the inlet of drain conduit 202 and comprises a plurality of non-horizontal drain ports 173, sealing surface 174, which is disposed between drain ports 173 and drain conduit 202, and stop 103, which is adapted for sealing engagement of sealing surface 174. Stop 103 comprises floatation device 175, which is shown in the configuration of a floating ball valve 183; means for urging the stop into sealing engagement with said sealing surface is provided by gravity, and the stop is adapted to permit disengagement of the stop from the sealing surface as a liquid 215, 200 enters said drain by floating away from the sealing surface, whereby drainage of the liquid through the drain is permitted, and backflow of gasses 201 from within is drain is prevented when no liquid is present in the drain. Drain ports 173 are substantially vertically oriented, being opened in side wall 184 of housing 113.

Figure 6:
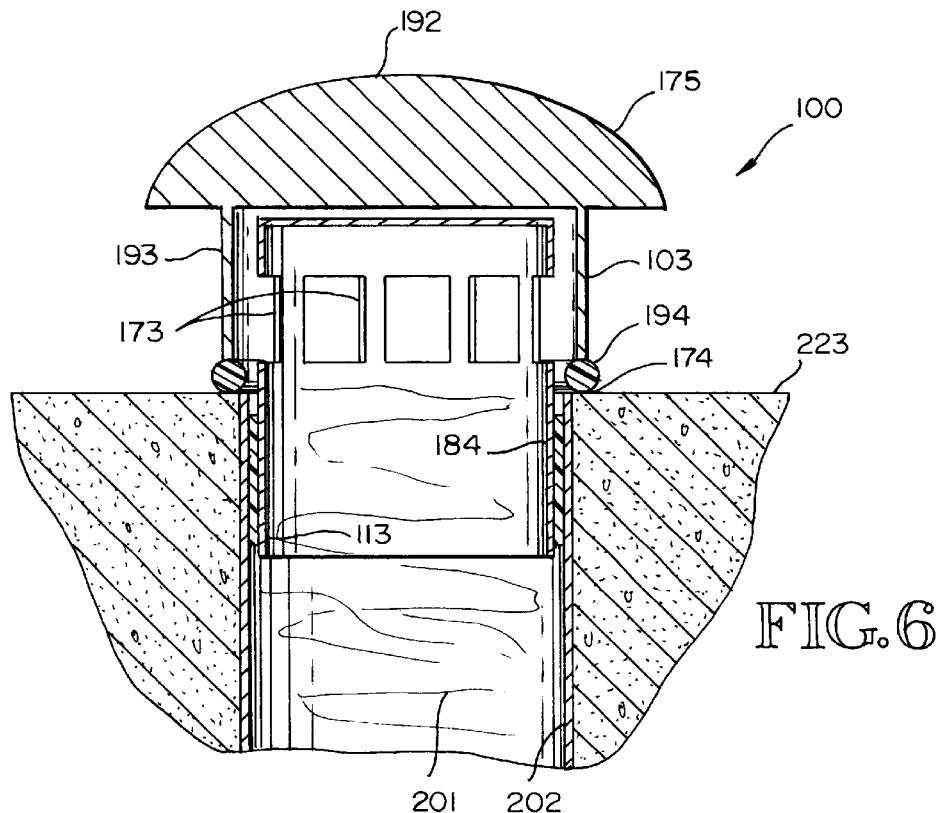
FIGS. 6 and 7 are schematic cutaway side views of an alternative preferred embodiment of a side port floor drain according to the invention.
Figure 7:
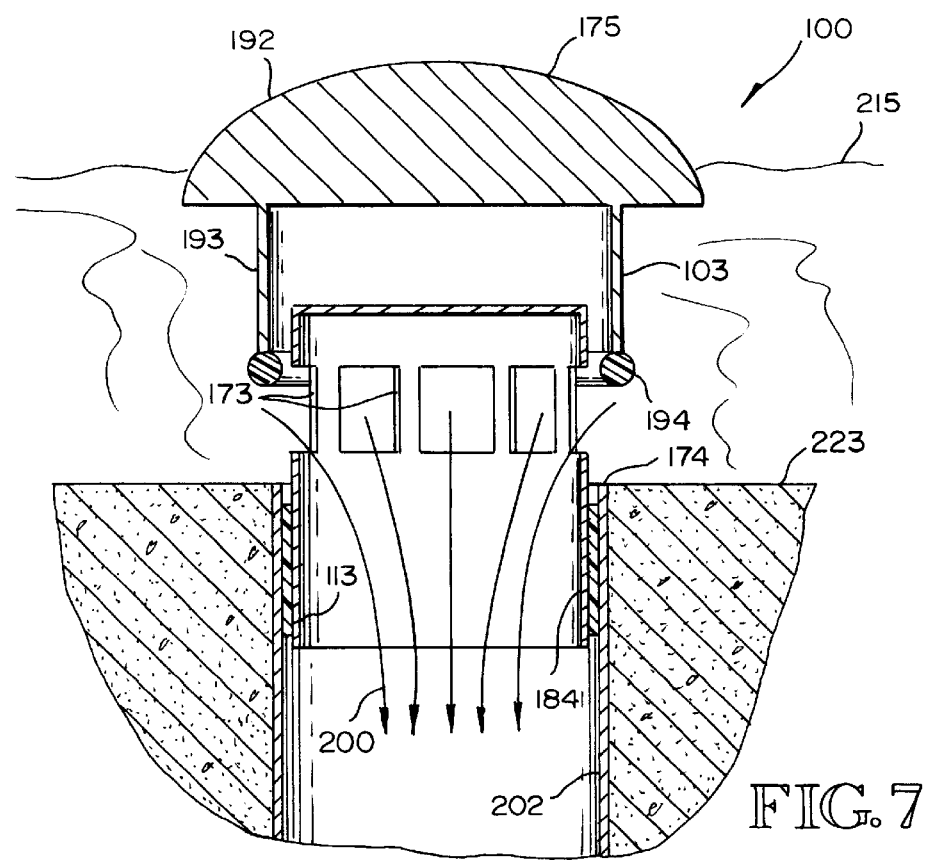

In FIGS. 6 and 7 the operation of yet another alternative preferred embodiment of the invention is shown. Side port floor drain 100 is in place within the inlet of drain conduit 202 and comprises a plurality of non-horizontal drain ports 173, sealing surface 174, which is disposed between drain ports 173 and drain conduit 202, and stop 103, which is adapted for sealing engagement of sealing surface 174. Stop 103 comprises floatation device 175, which is shown in the configuration of float 191, which comprises flotation member 192 and dependent skirt 193, which covers side ports 173 and with sealing surface 174 and gasket 194 acts as a stop for each of side ports 173. Again means for urging the stop into sealing engagement with said sealing surface is provided by gravity, and the stop is adapted to permit disengagement of the stop from the sealing surface as a liquid 215, 200 enters said drain by floating away from the sealing surface, whereby drainage of the liquid through the drain is permitted, and backflow of gasses 201 from within is drain is prevented when no liquid is present in the drain. Drain ports 173 are substantially vertically oriented, being opened in side wall 184 of housing 113.

In FIGS. 4–7 the drain assembly according to the invention operates by means of floatation of stops 103. As liquid 215 arrives on the drain surface 223, which might be a floor, a drain basin within a floor, or any other surface prone to or susceptible to flooding, and the flotation stops 175 rise away from contact or sealing engagement with sealing surfaces 174, upon which floatation devices 175 rise when no fluid is present. As stops 175 float away from sealing surfaces 174, liquid 215 is allowed to drain through ports 173. As the liquid recedes and the floatation devices return to their positions on the sealing surface, the seal is reeffected and any gasses 201 within drain conduit 202 are trapped within the conduit.

It may be seen that drains and valves according to the invention may be of arbitrary cross section or plan view. That is, they are readily adaptable to use with drains of circular cross section, as in the case of an ordinary drain pipe, or with rectangular conduit or conduit of any other shape. Embodiments of the invention adapted for use with pipes or conduits of substantially circular cross section are shown in FIGS. 1–3.

A further advantage of the use of drains and valves according to the invention is that they may be used either singularly or in combination with other valves of any type or number any number. In preferred embodiments of the invention, for example, two or more side port drain valves according to the invention may be used, either in series, or in parallel. One particularly useful combination is shown in FIG. 3. This drain combination comprises a side-port drain and a check valve such as that disclosed in our provisional patent application Ser. No. 60/141,913, entitled Check Valve Floor Drain and filed Jun. 30, 1999, the contents of which are hereby incorporated by this reference, as though set out in full.

Side port drain valves and associated components of the invention are advantageously made from any suitable materials. For example, valves and stops may be fabricated from natural or synthetic rubbers, or other suitable pliant and resilient materials, including a great many polymers, while stops and housings may be made of plastics such as PVC or APP, metals, or any of a wide variety of other materials.

With regard to systems and components above referred to, but not otherwise specified or described in detail herein, the workings and specifications of such systems and components and the manner in which they may be made or assembled or used, both cooperatively with each other and with the other elements of the invention described herein to effect the purposes herein disclosed, are all believed to be well within the knowledge of those skilled in the art. No concerted attempt to repeat here what is generally known to the artisan has therefore been made.

INDUSTRIAL APPLICABILITY

The invention has applicability in the field of plumbing and fluid control or removal. In particular, the invention represents improvements in drain systems for floors and other surfaces in which infrequent drainage must be reliably and efficiently processed.

In compliance with the statute, the invention has been described in language more or less specific as to structural features. It is to be understood, however, that the invention is not limited to the specific features shown, since the means and construction shown comprise preferred forms of putting the invention into effect. The invention is, therefore, claimed in any of its forms or modifications within the legitimate and valid scope of the appended claims, appropriately interpreted in accordance with the doctrine of equivalents.

We claim:

1. A method for fabricating a side port floor drain apparatus for admitting liquid from a draining surface into a drain conduit, and for preventing discharge of waste gas from the drain conduit into the atmosphere in response to a higher pressure in the drain conduit than at the draining surface, the fabrication method comprising the steps of:
   providing at least one drain port;
   providing each said drain port with a non-horizontal drain sealing surface;
   disposing a stop between the non-horizonital drain sealing surface and the drain conduit, the stop being adapted for sealing engagement of the drain sealing surface; and
   providing a means to urge the stop into sealing engagement with the drain sealing surface, the means adapted to permit disengagement of the stop from the scaling surface as liquid enters the floor drain,
   whereby drainage of the liquid through the drain port is permitted, and backflow of gasses from the drain conduit is prevented after liquid has drained.

2. A method for admitting liquid from a draining surface into a drain conduit, and for preventing discharge of waste gas from the drain conduit into the atmosphere in response to a higher pressure in the drain conduit than at the draining surface, the method comprising the steps of:
   providing a housing;
   disposing the housing in the flow path between liquid being drained and the drain conduit;
   providing at least one drain port in the housing;
   providing each said drain port with a non-horizonital drain scaling surface;
   disposing a stop between the non-horizontal drain sealing surface and the drain conduit, the stop adapted for sealing engagement of the drain sealing surface; and
   providing a means to urge the stop into sealing engagement with the drain sealing surface, the means adapted to permit disengagement of the stop from the sealing surface as liquid enters the floor drain,
   whereby drainage of liquid through the drain port is permitted, and backflow of gasses from the drain conduit after liquid has drained is prevented.

3. A side port floor drain apparatus for admitting liquid from a draining surface into a drain conduit and for preventing discharge of waste gas from the drain conduit into the atmosphere in response to a higher pressure in the drain conduit than at the draining surface, the floor drain apparatus comprising:
   a housing having circumferential walls with an exterior surface and an interior surface, an open bore extending throughout, a first section, a second inwardly tapered midsection, a third section designed for connection with the drain conduit, and a cover joined over the first section, forming a chamber adapted for connection with the drain conduit;
   a drain port through the walls of the housing having a non-horizontal drain sealing surface on the interior surface, the drain port creating a path for liquid from the exterior surface into the drain conduit; and
   a stop disposed on the interior surface, located between the non-horizontal drain sealing surface and the drain conduit, configured to scalingly engage the drain sealing surface and movably operate within the chamber, and further configured to admit liquid proximate to the exterior surface into the chamber and into the drain conduit and to prevent discharge of waste gas from the drain conduit into the atmosphere in response to a higher pressure in the drain conduit than at the draining surface.

4. A side port floor drain for draining liquid from a draining surface into a drain conduit, the floor drain comprising:

a drain port having a non-horizontal drain sealing surface;

a stop disposed between said non-horizontal drain sealing surface and said drain conduit, and adapted for sealing engagement of said drain sealing surface; and a means to urge the stop into sealing engagement with said drain sealing surface, and adapted to permit disengagement of the stop from the sealing surface as liquid enters said floor drain, whereby drainage of liquid through said drain port is permitted, and backflow of gasses from said drain conduit is prevented after liquid has drained.

5. The floor drain of claim 4, comprising a plurality of said drain ports.

6. The floor drain of claim 5, wherein at least one of said stops is located at an inlet end of said drain port, on an exterior surface of a floor drain housing, and at least a second stop is located at an outlet end of said drain port, on an exterior surface of said floor drain housing.

7. The floor drain of claim 5, wherein said drain ports are set in a drain housing and said stops are attached to a sleeve adapted for sealing engagement of said drain housing.

8. The floor drain of claim 4, wherein said stop is an elastic valve having sufficient flexibility to flex under action of liquid and to allow drainage of liquid, and to return to a substantially unflexed condition in which sealing engagement of said drain sealing surface by said elastic valve is restored following drainage of liquid.

9. The floor drain of claim 8, wherein said elastic valve is adapted to flex under the action of a preselected head pressure within said drain.

10. The floor drain of claim 9, wherein said valve comprises a substantially uniform thickness.

11. The floor drain of claim 4, wherein said sealing surface is substantially vertical.

12. The floor drain of claim 4, wherein said sealing surface is substantially sloped.

13. The floor drain of claim 4, wherein said stop is located at an inlet end of said drain, on an interior surface of a floor drain housing.

14. The floor drain of claim 4, wherein said stop is located at an outlet end of said drain, on an exterior surface of a floor drain housing.

15. The floor drain of claim 4, wherein said valve comprises a housing to support said stop and said means for urging said stop into sealing contact with said drain sealing surface, said housing adapted for removable or interchangeable disposition of said floor drain within an inlet to a drain conduit.

16. The floor drain of claim 4, wherein said valve is adapted for sealing engagement of a substantially circular drain conduit.

17. The floor drain of claim 4, wherein said valve is adapted for sealing engagement of a substantially non-circular drain conduit.

18. The floor drain of claim 4, connected in series with any other valve.

\* \* \* \* \*